United States Patent
Kraus (10) Patent No.: US 10,945,378 B2
(45) Date of Patent: Mar. 16, 2021

(54) METHOD OF CONTROLLING BALE SIZE BASED ON BALE WEIGHT

(71) Applicant: Deere & Company, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 272 days.

(21) Appl. No.: 15/988,684

(22) Filed: May 24, 2018

(65) Prior Publication Data

US 2019/0098835 A1 Apr. 4, 2019

Related U.S. Application Data

(60) Provisional application No. 62/566,784, filed on Oct. 2, 2017, provisional application No. 62/566,855, filed on Oct. 2, 2017.

(51) Int. Cl.
*A01F 15/07* (2006.01)
*A01F 15/08* (2006.01)

(52) U.S. Cl.
CPC .......... *A01F 15/0833* (2013.01); *A01F 15/07* (2013.01); *A01F 15/0883* (2013.01); *A01F 2015/0891* (2013.01)

(58) Field of Classification Search
CPC .. A01F 15/07; A01F 15/0883; A01F 15/0833; A01F 15/0825; A01F 15/0875;
(Continued)

(56) References Cited

U.S. PATENT DOCUMENTS 2,796,825 A * 6/1957 Kriegbaum ......... A01F 15/0825
100/43
5,384,436 A 1/1995 Pritchard
(Continued)

FOREIGN PATENT DOCUMENTS

EP 1029440 A1 8/2000
EP 2446731 A1 5/2012
(Continued)

OTHER PUBLICATIONS

European Patent Office Extended Search Report for Application No. 18197533.5 dated Mar. 6, 2019 (8 pages).
(Continued)

*Primary Examiner* — Jimmy T Nguyen
(74) *Attorney, Agent, or Firm* — Michael Best & Friedrich LLP (57) ABSTRACT

A system includes a baler configured to produce a first bale and a second bale succeeding the first bale. The first bale is configured to include a first surface defining a first dimension. The second bale is configured to include a second surface corresponding to the first surface of the first bale. The system also includes a sensor configured to weigh at least the first bale. The system further includes a control processor configured to receive a desired bale weight of the first bale, receive an actual bale weight of the first bale from the sensor, compare the desired bale weight to the actual bale weight of the first bale, and adjust a second dimension of the second surface of the second bale based on the comparison of the desired bale weight to the actual bale weight of the first bale.

13 Claims, 4 Drawing Sheets

(58) Field of Classification Search
CPC ..... A01F 2015/0808; A01F 2015/0891; G01G 17/00; G01G 19/08
See application file for complete search history.

(56) References Cited

U.S. PATENT DOCUMENTS

| | | |
|---|---|---|
| 6,378,276 B1 | 4/2002 | Dorge et al. |
| 7,703,391 B2 | 4/2010 | Duenwald et al. |
| 8,326,563 B2 | 12/2012 | Kraus |
| 9,182,269 B2 | 11/2015 | Kraus |
| 9,297,688 B2 * | 3/2016 | Posselius ................ A01F 15/08 |
| 9,854,744 B2 | 1/2018 | Smith |
| 2004/0245028 A1 * | 12/2004 | Viaud .................... G01G 19/12 177/145 |
| 2009/0217827 A1 | 9/2009 | Duenwald et al. |
| 2012/0103207 A1 | 5/2012 | Kraus |
| 2016/0165803 A1 * | 6/2016 | Smith .................... G05B 15/02 700/275 |
| 2016/0187185 A1 * | 6/2016 | Smith ................ A01F 15/0825 177/1 |

FOREIGN PATENT DOCUMENTS

| | | |
|---|---|---|
| EP | 3031317 | 6/2016 |
| EP | 3031317 A1 | 6/2016 |

OTHER PUBLICATIONS

European Patent Office Extended Search Report for Application No. 18197490.8 dated Mar. 6, 2019 (8 pages).

* cited by examiner

METHOD OF CONTROLLING BALE SIZE BASED ON BALE WEIGHT

CROSS-REFERENCE TO RELATED APPLICATIONS

This application claims priority to U.S. Provisional Patent Application No. 62/566,784 filed on Oct. 2, 2017 and U.S. Provisional Patent Application No. 62/566,855 filed on Oct. 2, 2017, the contents of both of which are incorporated herein by reference.

FIELD OF DISCLOSURE

The present disclosure relates to agricultural balers, in particular, the present disclosure relates to a method of controlling a size of agricultural crop packages (e.g., bales) produced by agricultural balers.

BACKGROUND

Typical agricultural balers are designed to form bales to a specified diameter that is programmed into a controller of the baler by an operator. In particular, the baler includes a sensor that measures a diameter of the bale being formed within the baler and when the bale reaches the specified diameter, the controller notifies the operator to stop baling, wrap the bale, and eject the completed bale from the baler.

SUMMARY

In some instances, the operator of the baler may want to make a bale to a specific bale weight rather than a specific bale diameter. For example, an operator may want the bales to weigh a specified amount to be loaded onto a truck to be shipped. Making the bales to a predefined weight (rather than a predefined bale diameter), allows the operator to know how much weight is on the truck based on the number of bales insuring that the truck does not exceed a maximum weight limit.

In one aspect of the disclosure, a system allows an operator of the baler to form bales to a specified weight by automatically adjusting a successive bale diameter to achieve the desired bale weight. For example, the system can weigh a first bale after the first bale has been formed to then adjust a diameter of a second bale, which follows the first bale, for the second bale to reach the desired bale weight. The diametrical value of the second bale can be determined by a density of the first bale or by a weight ratio of the first bale.

In another aspect, the system can weigh the bale while the baler is moving relative to an agricultural field supporting the baler and signal an operator of the baler when the bale reaches the desired weight.

In yet another aspect, a system includes a baler configured to produce a first bale and a second bale succeeding the first bale. The first bale is configured to include a first surface defining a first dimension. The second bale is configured to include a second surface corresponding to the first surface of the first bale. The system also includes a sensor configured to weigh at least the first bale. The system further includes a control processor configured to receive a desired bale weight of the first bale, receive an actual bale weight of the first bale from the sensor, compare the desired bale weight to the actual bale weight of the first bale, and adjust a second dimension of the second surface of the second bale based on the comparison of the desired bale weight to the actual bale weight of the first bale.

In yet another aspect, a system includes a baler configured to produce a bale and a sensor configured to weigh the bale. The system also includes a control processor configured to receive a desired bale weight of the bale, receive an actual bale weight of the bale from the sensor, compare the desired bale weight to the actual bale weight of the bale, and output a signal representing a condition of the bale based on the comparison of the desired bale weight to the actual bale weight of the bale.

In yet another aspect, a method of adjusting a size of a bale produced by a baler includes forming a first bale within the baler. The first bale is configured to include a first surface defining a first dimension. The method also includes determining an actual weight of the first bale by a sensor, ejecting the first bale from the baler, comparing a desired bale weight of the first bale to the actual bale weight of the first bale, and forming a second bale within the baler. The second bale is configured to include a second surface corresponding to the first surface of the first bale. The method further includes adjusting a second dimension of the second surface of the second bale based on the comparison of the desired bale weight to the actual bale weight of the first bale.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Terms of degree, such as "substantially" or "approximately" are understood by those of ordinary skill to refer to reasonable ranges outside of the given value, for example, general tolerances associated with manufacturing, assembly, and use of the described embodiments.

Figure 1:
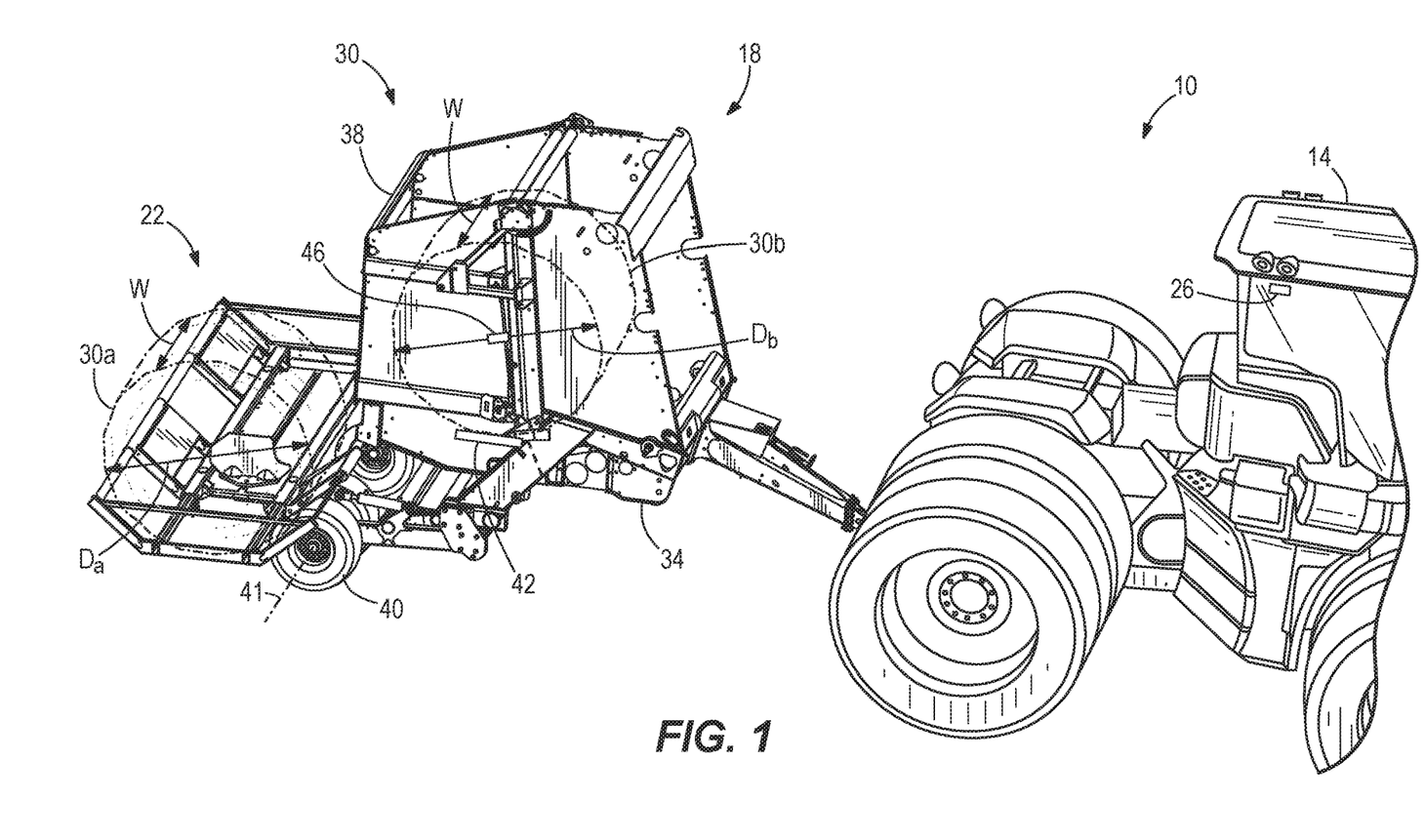
FIG. 1 is a perspective view of agricultural equipment including a vehicle coupled to an agricultural baler and an accumulator with a first agricultural crop package supported on the accumulator and a second agricultural crop package being formed within the agricultural baler.

FIG. 1 illustrates certain agricultural equipment 10 including a tractor 14, a baler 18, and a crop package accumulator 22. The baler 18 (e.g., a crop packaging system) and the accumulator 22 (e.g., a crop package handling system) are both coupled to the tractor 14, which moves the baler 18 and the accumulator 22 during an agricultural process (e.g., through an agricultural field). The illustrated agricultural equipment 10 also includes a control processor 26 that controls operation of the baler 18, described in more detail below. In the illustrated embodiment, the control processor 26 is coupled to the tractor 14. In other embodiments, the control processor 26 can be coupled to the baler 18. The illustrated tractor 14 also supplies operational power in the form of hydraulic, electrical, and/or mechanical power to the baler 18 and the accumulator 22.

The illustrated baler 18 is configured to produce cylindrical crop packages 30, each defined by two planar opposing side surfaces and a curved surface, from the agricultural field to be ejected from the baler 18 and supported (e.g., carried) on the accumulator 22. In the illustrated embodiment, the baler 18 produces crop packages or bales 30 having a variable side surface/profile dimension (e.g., a diameter, a radius, a circumference, etc. of the cylindrical crop packages 30) but a fixed width. For example, the baler 18 can produce a first completed crop package 30a having a side surface dimension $D_a$ (e.g., a first diameter) and a width W and produce a second completed crop package 30b having a side surface dimension $D_b$ (e.g., a second diameter) and the width W. The illustrated width W is oriented transverse to the side surface of the crop package 30 and is less than the diameters $D_a$, $D_b$ of the crop packages 30a, 30b. In one embodiment, the width W is about 56 inches. In other embodiments, the width W is between about 50 inches and about 60 inches. In other embodiments, the width W can be equal to or greater than the dimensions $D_a$, $D_b$ of the crop packages 30a, 30b. As described in more detail below, the first crop package 30a is formed within the baler 18 and ejected from the baler 18 before the second crop package 30b is formed and ejected from the baler 18. The baler 18 can produce crop packages from alfalfa, hay, corn stalks, and the like. In other embodiments, the baler 18 may produce cuboid crop packages, e.g., square bales, each defined by six planar surfaces.

In the illustrated embodiment, the baler 18 includes a baler front frame 34 to which a baler rear frame or a gate 38 is pivotally positionable between a closed position (FIG. 1) and an open position (not shown) by hydraulic actuators, e.g., hydraulic cylinders. In other embodiments, the baler gate 38 may translate or slide between the closed position and the open position. The baler front frame 34 is coupled to wheels 40 that support the baler 18 above the agricultural surface and are rotatable about an axis 41. In the illustrated embodiment, the width W of each crop package 30a, 30b is substantially parallel to the axis 41 so that the side profile dimension (e.g., the diameters $D_a$, $D_b$ of the crop packages 30a, 30b) are substantially perpendicular to the axis 41 when each crop package 30a, 30b is being formed within the baler 18.

The illustrated baler 18 also includes a first measurement device (e.g., a weight scale or first sensor 42) that is in communication with the control processor 26 and is operable to measure a weight of the crop packages 30a, 30b when the crop packages 30a, 30b are supported within the baler 18. In other embodiments, the accumulator 22 includes the weight scale 42 to measure a weight of the crop packages 30a, 30b when the crop packages 30a, 30b are supported on the accumulator 22 (e.g., after the crop packages 30a, 30b are ejected from the baler 18). The illustrated baler 18 also includes a second measurement device (e.g., a distance measurer or second sensor 46) that is also in communication with the control processor 26 and is operable to measure a length of a side profile (e.g., the diameter $D_a$, $D_b$ or radius) of the crop packages 30a, 30b when the crop packages 30a, 30b are supported within the baler 18. In an embodiment in which the baler 18 produces cuboid shaped crop packages, the distance measurer 46 can measure both lengths of a side profile of the crop packages 30, for example, if the crop packages 30 include a rectangular profile.

Figure 2:
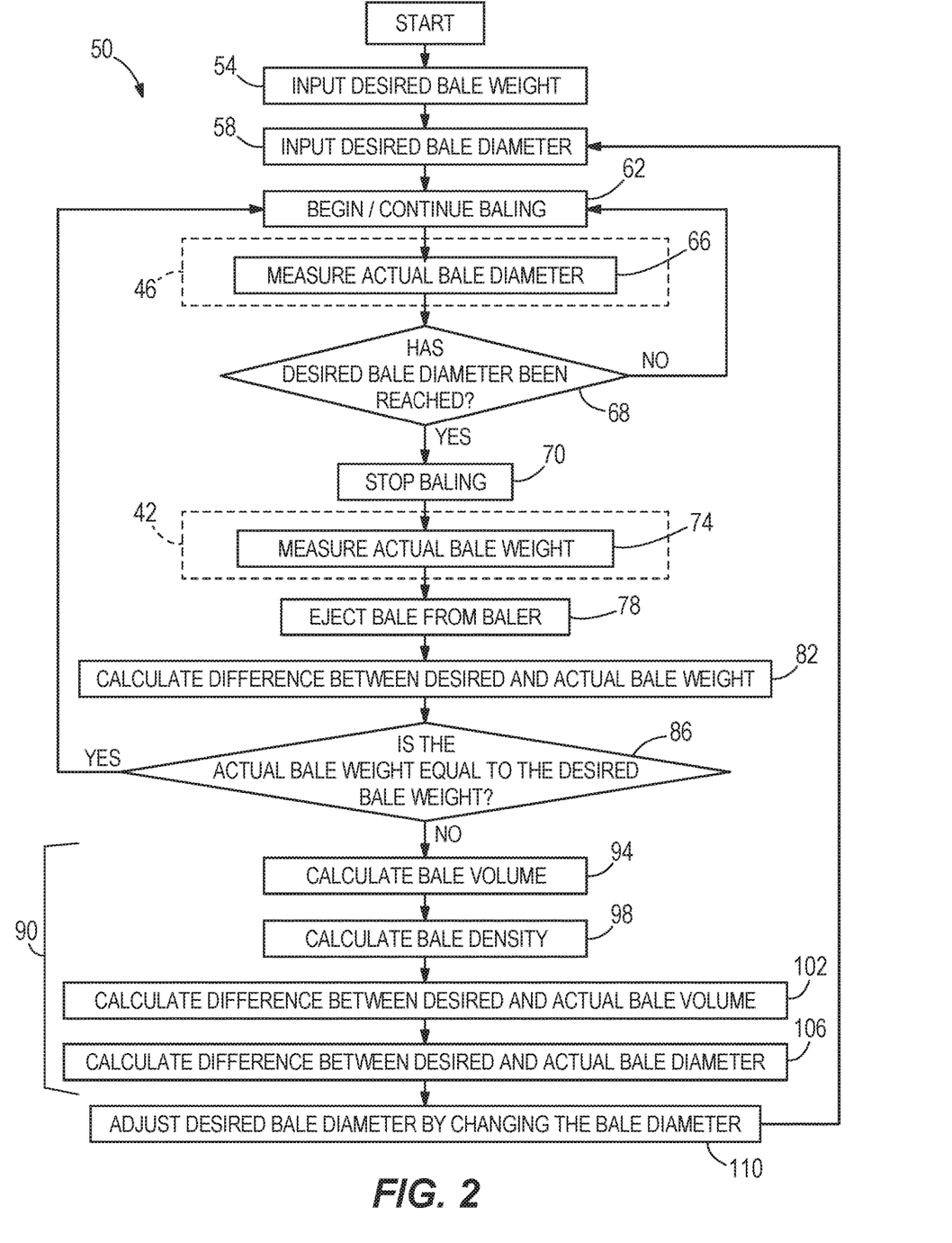
FIG. 2 is a flow diagram of a method of controlling a size of the second crop package based on a density of the first crop package according to an embodiment of the disclosure.
Figure 3:
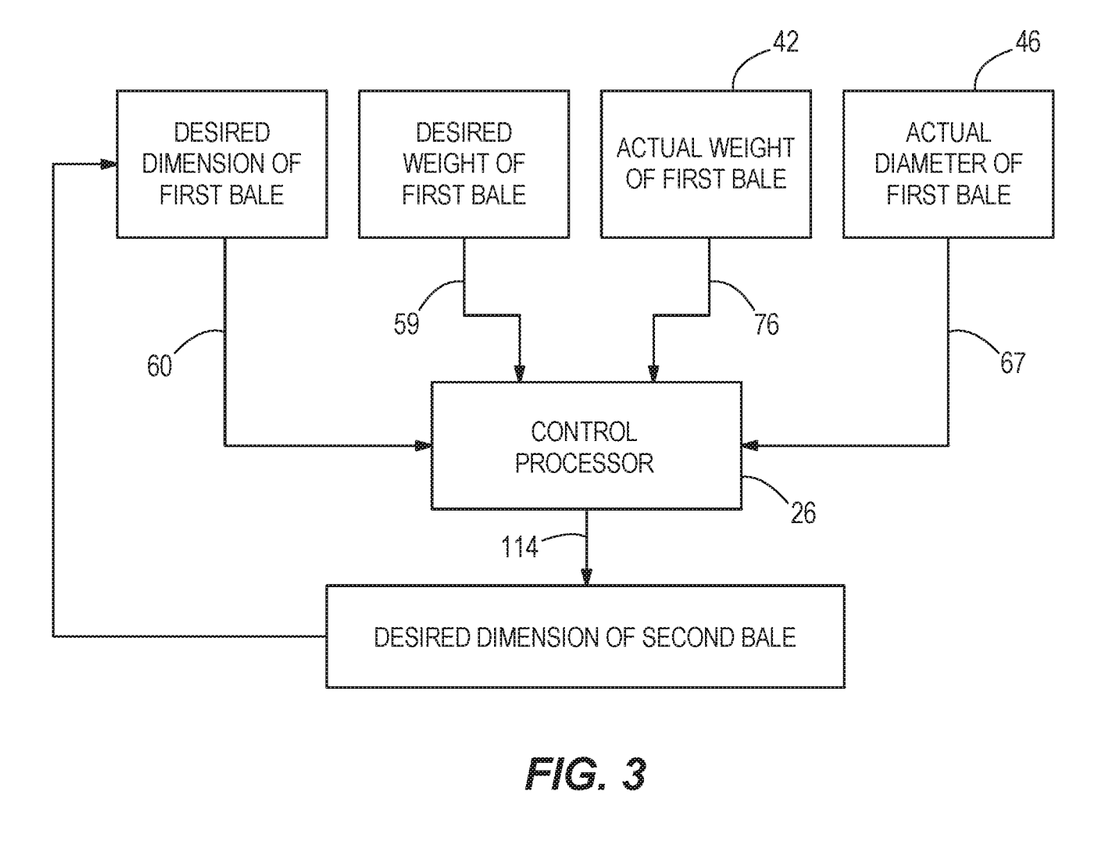
FIG. 3 is a schematic illustrating parameters associated with the method of FIG. 2.

With reference to FIG. 2, a method 50 of controlling a size (e.g., the diameter $D_b$) of the second crop package 30b (e.g., a successive crop package relative to the first crop package 30a) based on a density of the first crop package 30a (e.g., the completed crop package) is illustrated. The method 50 begins by an operator of the tractor 14 inputting a desired weight of the first crop package 30a (step 54) and inputting a desired diameter of the first crop package 30a (step 58) into the control processor 26, for example, through a user interface within a cab of the tractor 14. In other words, the control processor 26 receives a first input 59 that represents the desired weight of the first crop package 30a and receives a second input 60 that represents the desired diameter (e.g., dimension) of the first crop package 30a (FIG. 3). In one embodiment, the steps 54, 58 can be performed before the baler 18 starts to form the first crop package 30a (step 62), or the steps 54, 58 can be performed after the baler 18 starts to form the first crop package 30a but before the first crop package 30a is completely formed within the baler 18. The desired weight and diameter of the crop packages 30 can be based off of many variables including, for example, different crops having different densities (e.g., alfalfa includes a density of about 11 pounds per cubic foot, straw includes a density of about 8 pounds per cubic foot, etc.) and the operator can control the desired weight and/or desired diameter of an alfalfa crop package or a straw crop package accordingly.

After the first crop package 30a begins to form within the baler 18 (step 62), the control processor 26 signals the distance measurer 46 to measure the diameter $D_a$ of the first crop package 30a (step 66). For example, the control processor 26 receives a third input 67 from the distance measurer 46 that represents the measured diameter $D_a$ of the first crop package 30a (FIG. 3). If the measured or actual diameter $D_a$ of the first crop package 30a is less than the desired diameter of the first crop package 30a (step 68), the method 50 returns to step 62 and the baler 18 continues to form the first crop package 30a. However, if the measured diameter $D_a$ of the first crop package 30a is about equal to (e.g., within 10 percent of) the desired diameter of the first crop package 30a (e.g., the first crop package 30a is completely formed within the baler 18), the method 50 continues to step 70 and the baler 18 stops forming the first crop package 30a to not exceed the desired diameter of the first crop package 30a. Once the first crop package 30a is completely formed, the control processor 26 signals the weight scale 42 to measure the weight of the first crop package 30a (step 74). For example, the control processor 26 receives a fourth input 76 from the weight scale 42 that represents the measured weight of the first crop package 30a (FIG. 3). In the illustrated embodiment, the tractor 14—and ultimately the baler 18—come to a complete standstill (e.g., stationary) on the agricultural surface in order for the weight scale 42 to measure an accurate weight of the first crop package 30a. In other embodiments, the tractor 14 and the baler 18 can be moving along the agricultural surface while the weight scale 42 measures the weight of the first crop package 30a. However, as the baler 18 would likely travel on an irregular agricultural surface (e.g., including bumps, etc.) while the weight scale 42 measures the weight of the first crop package 30a, the control processor 26 can filter out the inaccurate data (e.g., noise) caused by the irregular agricultural surface to obtain an accurate weight measurement of the first crop package 30a. Once the weight of the first crop package 30a is measured, the baler gate 38 moves into the open position to allow for the first crop package 30a to be ejected from the baler 18 (step 78) and onto the accumulator 22. After the first crop package 30a is ejected from the baler 18, the gate 38 returns to the closed position (FIG. 1) for the baler 18 to begin forming the second crop package 30b. In some embodiments, the weight of the first crop package 30a is measured after the first crop package 30a is ejected from the baler 18 (e.g., when the first crop package 30a is supported on the accumulator 22). In other embodiments, the accumulator 22 is omitted so that the first crop package 30a is ejected out of the baler 18 directly onto the agricultural surface. In further embodiments, the weight of the first crop package 30a can be measured before the first crop package 30a reaches its desired diameter to ensure that the weight of the first crop package 30a is close to its desired weight.

With continued reference to FIG. 2, the control processor 26 also calculates a difference between the desired weight and the measured weight of the first crop package 30a (step 82). In the illustrated embodiment, step 82 is performed after the first crop package 30a is ejected from the baler 18 (step 78); however, in other embodiments, step 82 can be performed before the first crop package 30a is ejected from the baler 18. Step 86 then compares the desired weight from step 54 with the actual weight from step 74 of the first crop package 30a. In particular, if the difference between the desired weight and the measured weight of the first crop package 30a is about zero (e.g., plus or minus 10 percent), the method 50 returns to step 62 to begin or continue forming the second crop package 30b within the baler 18. In other words, if the difference between the desired weight and the measured weight of the first crop package 30a is about zero, the control processor 26 signals the baler 18 to produce the second crop package 30b having the substantially same diameter as the first crop package 30a, which will provide the substantially same weight as the first crop package 30a. However, if the difference between the desired weight and the measured weight is not equal to zero (e.g., outside 10 percent), the method 50 continues to a series of adjustment steps 90 to adjust the desired diameter of the second crop package 30b so that the second crop package 30b reaches the desired weight (step 54), described in more detail below. Discrepancies between the measured weight and the desired weight of the first crop package 30a after the measured diameter $D_a$ reaches the desired diameter of the first crop package 30a (proceeding into step 70) could be caused by, for example, additional moisture in or attached to the crop being baled.

The illustrated series of adjustment steps 90 involve determining certain parameters of the first crop package 30a in order to adjust the actual diameter $D_b$ of the second crop package 30b by a desired amount. In one embodiment, the adjustment steps 90 can be performed by the control processor 26 before step 86. The adjustments steps 90 described below are specific to cylindrical crop packages and a diameter of the cylindrical crop packages. As such, at least some of the equations below can be modified if the baler 18 produces cuboid crop packages or if the distance measurer 46 measures a radius of the crop packages. The illustrated adjustment steps 90 include a step 94 that calculates an actual volume of the first crop package 30a with the control processor 26, for example, by the following equation:

$$\text{Actual volume of first crop package} = \left(\frac{\pi * D_a^2}{4}\right) * W \quad (1)$$

where $D_a$ is the actual diameter of the first crop package 30a from step 66 and W is the width of the first crop package 30a, which is the same width as the second crop package 30b. In other embodiments, the actual diameter $D_a$ of the first crop package 30a can be replaced with the desired diameter of the first crop package 30a from step 58 as the baler 18 forms and completes the first crop package 30a to the desired diameter.

From the calculated volume in the step 94, a density of the first crop package 30a can be determined by the control processor 26 (step 98). The density of the first crop package 30a is determined, for example, by dividing the measured weight of the first crop package 30a (step 74) by the actual volume of the first crop package 30a, as shown in the following equation:

$$\text{Density of first crop package} = \frac{\text{Measured weight of first crop package}}{\text{Actual volume of first crop package}} \quad (2)$$

The control processor 26 then determines a difference between a desired volume of the first crop package 30a (if the first crop package 30a was formed to the desired weight) and the actual volume of the first crop package 30a (step 102), for example, by dividing the difference between the desired weight and the measured weight of the first crop package 30a (step 82) by the density of the first crop package 30a (step 98), as illustrated in the following equation:

$$\text{Difference in volume of first crop package} = \frac{\text{Difference in weight of first crop package}}{\text{Density of first crop package}} \quad (3)$$

From the calculated difference between the desired volume and the measured volume of the first crop package 30a in the step 102, the control processor 26 then determines a difference between a desired diameter of the first crop package 30a (if the first crop package 30a was formed to the desired weigh) and the measured diameter of the first crop package 30a (step 106). In particular, the difference between the desired diameter and the measured diameter of the first crop package 30a is determined, for example, by the following equation:

$$\text{Difference in diameter of first crop package} = 2 * \left(\frac{\text{Difference in volume of first crop package}}{W * \pi}\right)^{\frac{1}{2}} \quad (4)$$

Step 106 represents how much the desired diameter of the second crop package 30b needs to change in order to reach the desired weight of the second crop package 30b. In other words, the measured diameter $D_b$—and ultimately the weight—of the second crop package 30b can be adjusted based on the difference in diameter (step 106) from the first crop package 30a. Accordingly, the method 50 includes step 110 that automatically adjusts the desired diameter in step 58 before the second crop package 30b is completely formed within the baler 18. Stated another way, the control processor 26 outputs a fifth signal 114 to change the desired diameter of the second crop package 30b (FIG. 3). For example, the control processor 26 will increase the desired diameter of the second crop package 30b if the measured weight of the first crop package 30a is less than the desired weight of the first crop package 30a (step 82) by the quantity calculated within the step 106. Conversely, the control processor 26 will decrease the desired diameter of the second crop package 30b if the measured weight of the first crop package 30a is greater than the desired weight of the first crop package 30a (step 82) by the quantity calculated within the step 106.

The illustrated method 50 continues by measuring the actual diameter $D_b$ of the second crop package 30b by the distance measurer 46 (step 66), and if the measured diameter $D_b$ reaches the adjusted desired diameter of the second crop package 30b (step 68), the weight of the second crop package 30b is measured by the weight scale 42 (step 74). Then, if the measured weight of the second crop package 30b is about equal (e.g., plus or minus 10 percent) to the desired weight of the second crop package 30b from step 54, the control processor 26 prepares the baler 18 to form a third crop package. However, if the measured weight of the second crop package 30b is not equal to the desired weight, the adjustment steps 90 are performed to adjust a desired diameter of a third crop package so that the third crop package reaches the desired weight.

Figure 4:
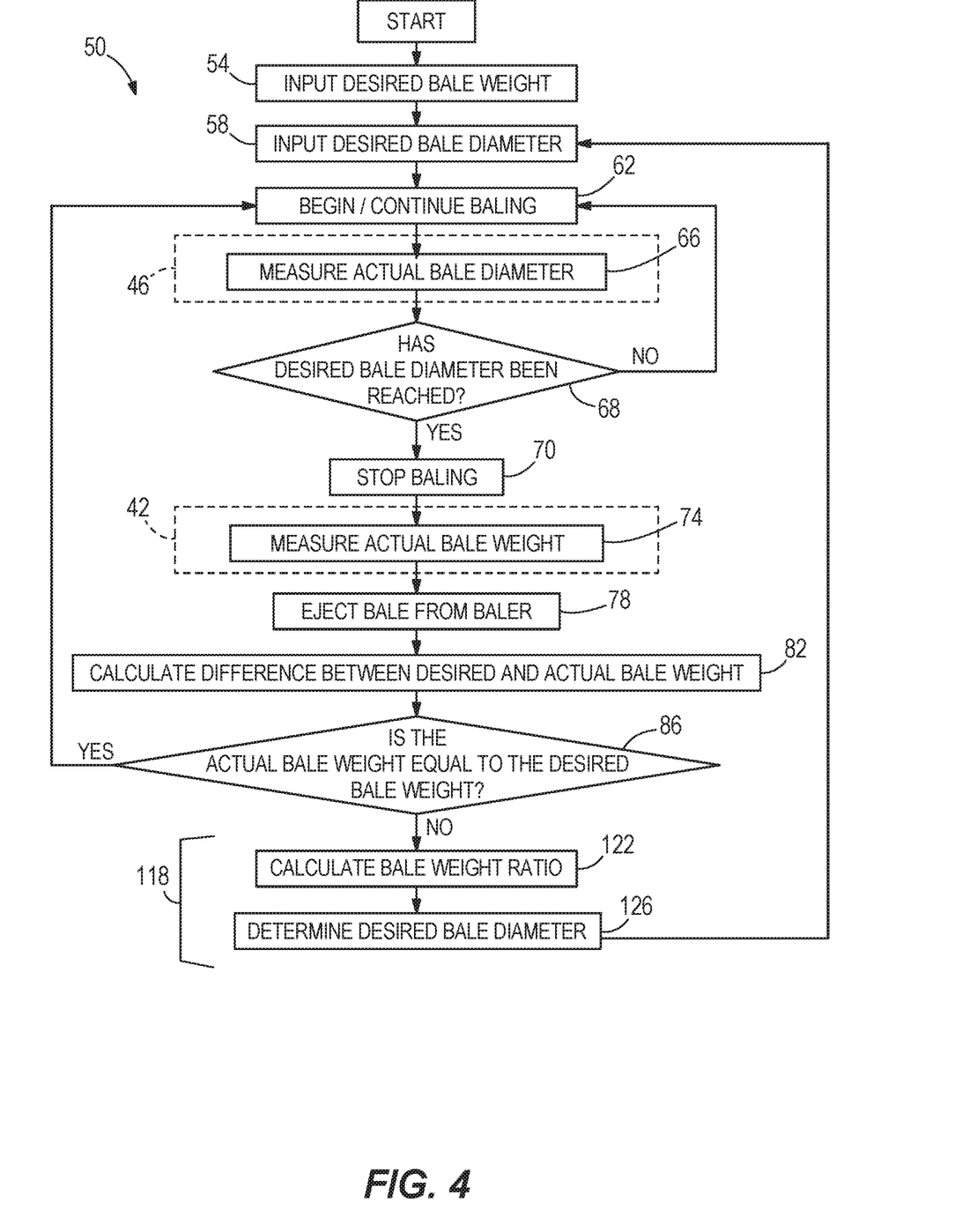
FIG. 4 is a flow diagram of a method of controlling a size of the second crop package based on a weight ratio of the first crop package according to another embodiment of the disclosure.

FIG. 4 illustrates the method 50 including a different series of adjustment steps 118. The illustrated adjustment steps 118 control a size (e.g., the diameter $D_b$) of the second crop package 30b based on a weight ratio of the measured weight of the first crop package 30a (step 74) to the desired weight of the first crop package 30a (step 54). The weight ratio of the measured weight of the first crop package 30a to the desired weight of the first crop package 30a can be calculated, for example, by the following equation:

$$\text{Weight ratio} = \frac{\text{Measured weight of first crop package}}{\text{Desired weight of first crop package}} \quad (5)$$

The weight ratio can also be calculated by dividing the volume of the first crop package 30a over the volume of the second crop package 30b (with the densities of the first and second crop packages 30a, 30b being substantially equal) as shown in the following equation:

$$\text{Weight ratio} = \frac{\text{Volume of first crop package}}{\text{Volume of second crop package}} \quad (6)$$

where the volume of the first crop package 30a can be calculated by the following equation:

$$\text{Volume of first crop package} = \left(\frac{\pi * D_a^2}{4}\right) * W \quad (7)$$

with $D_a$ being the actual diameter of the first crop package 30a from step 66 and W being the width of the first crop package 30a, and where the volume of the second crop package 30b can be calculated by the following equation:

$$\text{Volume of second crop package} = \left(\frac{\pi * D_2^2}{4}\right) * W \quad (8)$$

with $D_2$ being a desired diameter of the second crop package 30b (to form the second crop package 30b to the desired weight) and W being the width of the second crop package 30b.

As such, by combining equations (6) through (8), the weight ratio equals the following equation:

$$\text{Weight ratio} = \frac{\left(\frac{\pi * D_a^2}{4}\right) * w}{\left(\frac{\pi * D_2^2}{4}\right) * w} \quad (9)$$

Then, by solving for the desired diameter $D_2$ of the second crop package 30b, the following equation exists:

$$\text{Desired diameter of second crop package} = \sqrt{\frac{D_a^2}{\text{Weight ratio}}} \quad (10)$$

Therefore, the desired diameter $D_2$ of the second crop package 30b can be calculated based upon the actual diameter $D_a$ of the first crop package 30a and by the weight ratio. In particular, the control processor 26 can calculate the weight ratio in step 122 by dividing the measured weight of the first crop package 30a (step 74) over the desired weight of the first crop package 30a (step 54). Then, by using the calculated weight ratio, the control processor 26 can calculate the desired diameter $D_2$ of the second crop package 30b in step 126 using equation (10). Once the desired diameter $D_2$ is determined, the method 50 proceeds to step 58 for the baler 18 to form the second crop package 30b at the desired diameter $D_2$, which ultimately forms the second crop package 30b to the desired weight.

In other embodiments, the weight scale 42 can measure the weight of a crop package 30 as the baler 18 moves along the agricultural surface, as previously described. In this embodiment, the method 50 can include step 54 (the operator selecting a desired weight of the crop package 30 being formed within the baler 18), step 74 (the weight scale 42 measuring an actual weight of the crop package 30 as the baler 18 moves along the agricultural surface), and step 78 (the baler 18 ejecting the crop package 30 once the actual weight of the crop package 30 is substantially equal to the desired weight of the crop package 30). Accordingly, the first crop package 30a can be formed by the baler 18 directly to the desired weight during continuous movement of the baler 18 compared to the previous embodiments discussed above that adjust a desired diameter of the second crop package 30b based on a density/weight ratio of the first crop package 30a. In one embodiment, the control processor 26 sends a signal to the operator of the tractor 14 to eject the crop package 30 from the baler 18 once the crop package 30 is near to or at the desired weight. In other embodiments, the control processor 26 sends a signal to the gate 38 to be moved into the open position for the baler 18 to automatically eject the crop package 30 from the baler 18 once the crop package 30 is at the desired weight.

Although particular embodiments embodying independent aspects of the present disclosure have been shown and described, other alternative embodiments will become apparent to those skilled in the art and are within the intended scope of the independent aspects of the disclosure. In addition, components, features, steps, etc. described with respect to one or some of the embodiments described herein are equally applicable to any other embodiment described herein.

The invention claimed is:

1. A system comprising:
a baler configured to produce a first bale and a second bale succeeding the first bale, the first bale configured to include a first surface defining a first dimension, the second bale configured to include a second surface corresponding to the first surface of the first bale;
a sensor configured to weigh at least the first bale; and
a control processor configured to
receive a desired bale weight of the first bale,
receive an actual bale weight of the first bale from the sensor,
compare the desired bale weight to the actual bale weight of the first bale, and
adjust a second dimension of the second surface of the second bale based on the comparison of the desired bale weight to the actual bale weight of the first bale.

2. The system of claim 1, wherein the second dimension of the second bale is adjusted based upon a density of the first bale.

3. The system of claim 2, wherein the control processor is configured to calculate the density of the first bale with the following equation:

$$\text{The density of the first bale} = \frac{\text{The actual bale weight of the first bale}}{\text{An actual volume of the first bale}}.$$

4. The system of claim 3, wherein the control processor is configured to determine the actual volume of the first bale with the following equation:

$$\text{The actual volume of the first bale} = \left(\frac{\pi * D_a^2}{4}\right) * W$$

wherein the first dimension of the first bale is a first diameter, and wherein $D_a$ is the first diameter of the first bale, and wherein W is a width of the first bale oriented transverse to the first diameter of the first bale.

5. The system of claim 4, wherein the control processor is configured to determine a difference between a desired volume of the first bale and the actual volume of the first bale with the following equation:

$$\text{The difference in volumes} = \frac{\text{The difference between the desired weight and the actual weight of the first bale}}{\text{The density of the first bale}}.$$

6. The system of claim 5, wherein the sensor is a first sensor, and wherein the system further comprises a second sensor configured to measure the first diameter of the first bale, and wherein the control processor is configured to determine a difference between a desired diameter of the first bale and the measured first diameter of the first bale with the following equation:

$$\text{A difference in diameters} = 2 * \left(\frac{\text{The difference in volumes}}{W * \pi}\right)^{\frac{1}{2}}.$$

7. The system of claim 6, wherein the control processor is configured to adjust the second dimension of the second bale by a quantity determined by the difference between the desired diameter of the first bale and the measured first diameter of the first bale.

8. The system of claim 1, wherein the second dimension of the second bale is adjusted based upon a ratio of the actual bale weight to the desired bale weight of the first bale.

9. The system of claim 8, wherein the sensor is a first sensor, and wherein the system further comprises a second sensor configured to measure the first dimension of the first bale, wherein the second dimension of the second bale is calculated by the following equation:

$$\text{The second dimension of the second bale} = \sqrt{\frac{D_a^2}{W_r}}$$

wherein the first dimension of the first bale is a first diameter, and wherein $D_a$ is the measured first diameter of the first bale, and wherein $W_r$ is the ratio of the actual bale weight to the desired bale weight of the first bale.

10. A method of adjusting a size of a bale produced by a baler, the method comprising:
forming a first bale within the baler, the first bale configured to include a first surface defining a first dimension;
determining an actual weight of the first bale by a sensor;
receiving, via a control processor, a desired bale weight of the first bale;
receiving, via the control processor, the actual weight of the first bale from the sensor;
ejecting the first bale from the baler;
comparing the desired bale weight of the first bale to the actual bale weight of the first bale;
forming a second bale within the baler succeeding forming the first bale, the second bale configured to include a second surface corresponding to the first surface of the first bale; and
adjusting a second dimension of the second surface of the second bale based on the comparison of the desired bale weight to the actual bale weight of the first bale.

11. The method of claim 10, wherein adjusting the second dimension of the second bale includes adjusting the second dimension of the second bale based upon a density of the first bale.

12. The method of claim 10, wherein adjusting the second dimension of the second bale includes adjusting the second dimension of the second bale based upon a ratio of the actual bale weight to the desired bale weight of the first bale.

13. The method of claim 10, wherein adjusting the second dimension of the second bale includes adjusting a diameter of the second bale.

* * * * *